United States Patent [19]

Yatka et al.

[11] Patent Number: 5,034,231

[45] Date of Patent: Jul. 23, 1991

[54] ALITAME STABILITY USING HYDROGENATED STARCH HYDROLYSATE SYRUPS

[75] Inventors: Robert J. Yatka, Orland Park; Bruce E. Foster, Woodridge, both of Ill.

[73] Assignee: Wm. Wrigly, Jr. Company, Chicago, Ill.

[21] Appl. No.: 487,760

[22] Filed: Mar. 1, 1990

Related U.S. Application Data

[63] Continuation-in-part of Ser. No. 1,269, Mar. 28, 1989.

[51] Int. Cl.$^5$ .............................................. A23G 3/30
[52] U.S. Cl. ...................................... 426/3; 426/548; 426/804
[58] Field of Search ........................................ 426/3-6, 426/548, 804

[56] References Cited

U.S. PATENT DOCUMENTS

| | | | |
|---|---|---|---|
| 3,955,000 | 5/1976 | Baggerly | 426/96 |
| 4,208,431 | 6/1980 | Friello et al. | 426/3 |
| 4,384,004 | 5/1983 | Cea et al. | 426/3 |
| 4,411,925 | 10/1983 | Brennen et al. | 426/548 X |
| 4,517,379 | 5/1985 | Brennan et al. | 426/548 |
| 4,536,396 | 8/1985 | Stephens, Jr. et al. | 426/3 X |
| 4,556,565 | 12/1985 | Arima et al. | 426/3 |
| 4,738,854 | 4/1988 | Friello et al. | 426/3 |
| 4,753,806 | 6/1988 | Carroll et al. | 426/3 |
| 4,774,094 | 9/1988 | Carroll et al. | 426/3 |
| 4,792,453 | 12/1988 | Reed et al. | 426/5 |
| 4,806,364 | 2/1989 | Kabota et al. | 426/5 |
| 4,861,600 | 8/1989 | Chisari et al. | 426/3 |
| 4,863,745 | 5/1989 | Zibell | 426/5 |
| 4,889,726 | 12/1989 | Dave et al. | 426/6 |
| 4,889,727 | 12/1989 | Dave et al. | 426/6 |
| 4,904,482 | 2/1990 | Patel et al. | 426/3 |
| 4,931,295 | 6/1990 | Courtright et al. | 426/5 |

FOREIGN PATENT DOCUMENTS

| | | |
|---|---|---|
| 0320522 | 6/1989 | European Pat. Off. . |
| 0320523 | 6/1989 | European Pat. Off. . |
| 0354680 | 2/1990 | European Pat. Off. . |
| 58-198250 | 11/1983 | Japan . |
| 59-173066 | 9/1984 | Japan . |
| WO01862 | 5/1985 | PCT Int'l Appl. . |
| WO90/06061 | 6/1990 | PCT Int'l Appl. . |

OTHER PUBLICATIONS

Brochure entitled, "Alitame—A New High-Intensity Sweetener, Technical Summary, 1987".

Primary Examiner—Jeanette Hunter
Attorney, Agent, or Firm—Willian Brinks Olds Hofer Gilson & Lione

[57] ABSTRACT

A comestible containing sweetening amounts of Alitame is disclosed, into which is incorporated an effective amount of hydrogenated starch hydrolysate syrup, and/or from which is excluded glycerine, to stabilize the Alitame against decomposition during storage such that after storage at 85° F. for eight weeks, at least 40% of the originally present Alitame has not degraded into non-sweetening decomposition products.

12 Claims, No Drawings

5,034,231

ALITAME STABILITY USING HYDROGENATED STARCH HYDROLYSATE SYRUPS

CROSS REFERENCE TO RELATED APPLICATION

This application is a continuation-in-part of application Ser. No. 001,269, filed Mar. 28, 1989, now pending incorporated herein by reference.

BACKGROUND OF THE INVENTION

The present invention relates to comestibles sweetened with Alitame. More particularly, the invention relates to chewing gum containing Alitame wherein the stability of the Alitame is improved.

Alitame is a high-potency sweetener with a chemical composition of L-$\alpha$-Aspartyl-N-(2,2,4,4-tetramethyl-3-thietanyl)-D-alaninamide hydrate. This sweetener, which is not yet approved for use in food products and chewing gum, is being considered by the FDA as a food additive. The manufacturer of Alitame is the Pfizer Corporation of Groton, Connecticut. Alitame is considered to be about 2000 times as sweet as sugar, and 5 to 10 times as sweet as aspartame. Aspartame, another dipeptide high-potency sweetener, is a wellknown comestible ingredient, but also has problems in that it degrades in the presence of water, and is especially unstable at pH's below 3 and above 5. Several patents have discussed various procedures for preventing degradation of aspartame into non-sweetening decomposition products. For example, U.S. Pat. No. 4,738,854 suggests that comestible compositions such as chewing gum containing unencapsulated aspartame may be protected against moisture induced degradation by including freely dispersed hydrogenated starch hydrolysate (HSH) in the comestible. The patent suggests that preferably 7 to 15% HSH is used, and that 70 to 80% or more of the aspartame is recoverable after 24 days of storage at 105° F. and 30% relative humidity. The patent also states that liquid sorbitol, in lieu of HSH, does not provide compositions in which the aspartame is very stable over long periods of time.

Japanese Pat. Application Publication 59-173066 discloses the use of various saccharides, including hydrogenated starch hydrolysates, as providing an aspartame stability effect in high water content food products.

U.S. Pats. Nos. 4,753,806 and 4,774,094 disclose the use of "cooked" HSH solutions to stabilize aspartame and make a flexible gum. Other patents teach the use of aspartame and HSH in chewing gum. For example, PCT Application PCT/US83/0173, published as WO 85/01862 on May 9, 1985, (which appears to be the equivalent disclosure of U.S. Pat. No. 4,556,565) discloses the use in sugarless gum of aspartame encapsulated with a syrup which includes HSH.

U.S. Pat. No. 4,208,431 discloses a chewing gum which optionally includes both HSH and aspartame.

Alitame has been suggested for use in chewing gum. Such use has been disclosed in several patents U.S. Pat. No. 4,411,925 discloses simple addition of Alitame in gum. U.S. Pat. No. 4,536,396 discloses combinations of Alitame and Acesulfame K in foods including chewing gum. These patents, however, do not discuss Alitame stability.

Alitame has been found to be relatively unstable and susceptible to degradation in chewing gums containing certain ingredients. This result was rather unexpected since Alitame has been shown to be much more stable in aqueous solutions than aspartame, and therefore, was expected to be much more stable in chewing gum. It would be considered a significant improvement to a chewing gum or other comestible to have the Alitame used to sweeten the comestible protected from such degradation.

SUMMARY OF THE INVENTION

It has been found that including an aqueous HSH syrup in comestibles containing Alitame enhances the stability of the Alitame with respect to the ingredients that cause Alitame degradation. It has also been found that limiting the amount of glycerine used in the comestible improves the Alitame stability. Thus the present invention includes ingestibles comprising sweetness imparting amounts of Alitame which also includes HSH in amounts, and/or limits glycerine to levels, effective to stabilize the Alitame against decomposition during storage of 85° F. for eight weeks, whereby at least a 20% increase of Alitame stability is obtained compared to a similar formula without HSH or with glycerine.

DETAILED DESCRIPTION OF THE INVENTION AND PREFERRED EMBODIMENTS

As used herein, the term chewing gum includes all types of gum compositions, including chewing gum, bubble gum and the like.

All percents used herein are weight percents unless otherwise specified.

The hydrogenated starch hydrolysates may be produced by catalytic hydrogenation of standard glucose syrups (acid and/or enzyme converted) to the point where all the glucose end groups or the saccharides are reduced to alcohols, that is, dextrose to sorbitol The total solids contents will usually range from about 65 to about 80%, which solids are made of from about 4 to about 70%, and preferably about 4 to about 20% sorbitol, from about 8 to 65%, and preferably from about 20 to about 65% hydrogenated disaccharides (that is, maltitol), and 20 to 80% of the higher ($\geq$ tri to hepta) hydrogenated saccharides. The preferred hydrogenated starch hydrolysates contain from about 7 to about 45%, and preferably about 15 to 45%, tri- to heptahydrogenated saccharides, and from about 10 to about 35%, and preferably about 15 to 25%, hydrogenated saccharides higher than hepta.

Hydrogenated starch hydrolysate syrup is also referred to in the literature as hydrogenated glucose syrup, or by the trademark or tradename Lycasin polyol or Lonza polyol. The term hydrogenated starch hydrolysate (HSH) will be used herein to designate such material The hydrogenated starch hydrolysate is usually sold commercially in the form of an aqueous solution having a moisture content of about 20 to 35%.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba However as discussed in U.S. patent Application Serial No. 07/487,744, entitled "Storage Stable Chewing Gum Containing Alitame" filed on Mar. 1, 1990 and hereby incorporated by reference, waxes are not preferred in gums of the present invention. According to the preferred embodiment of the present invention, the insoluble gum base constitutes between about 5 to about 95 percent by weight of the gum. More preferably the insoluble gum base comprises between 10 and 50 percent by weight of the gum and most preferably about 20 to about 35 percent by weight of the gum.

The gum base typically also includes a filler component. The filler component may be calcium carbonate, magnesium carbonate, talc, dicalcium phosphate or the like. If wax is used in the gum, the preferred filler is talc, and calcium carbonate should be excluded The filler may constitute between about 5 and about 60 percent by weight of the gum base. Preferably, the filler comprises about 5 to about 50 percent by weight of the gum base.

Gum bases typically also contain softeners, including glycerol monostearate and glycerol triacetate. Further, gum bases may also contain optional ingredients such as antioxidants, colors, and emulsifiers.

The water-soluble portion of the chewing gum contains a bulking and sweetening agent. In sugar gums, the bulking and sweetening agent is the same, sucrose. In sugarless gums, the bulking and sweetening agents usually include sorbitol and high potency sweeteners like aspartame, or in this case, Alitame. The bulking and sweetening agents usually comprise from about 30 to about 90 percent of the gum composition, and preferably about 50 to about 80 percent.

The water-soluble portion of the chewing gum may further comprise softeners, other sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof Further, aqueous sweetener solutions such as those containing sorbitol, hydrogenated starch hydrolysates, corn syrup and combinations thereof may be used as softeners and binding agents in gum. However, as discussed below, certain ingredients used as softeners have been found to greatly affect the stability of Alitame.

The flavor agent used in the gum may be present in an amount within the range of from about 0.1 to about 10.0 weight percent and preferably from about 0.5 to about 3.0 weight percent of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorally acceptable blend. All such flavors and flavor blends are contemplated by the present invention. However, some flavors may cause degradation of the Alitame. See U.S. patent application Ser. No. 07/458,989, entitled "Improved Alitame Stability In Chewing Gum By Encapsulation", filed Dec. 29, 1989 now U.S. Pat. No. 4,997,659, incorporated herein by reference. Therefore, when producing storage stable gums sweetened with unencapsulated Alitame, flavors should be used which do not cause Alitame degradation.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets Generally, the ingredients are mixed by first melting the gum base and adding it to the running mixer. The base may also be melted in the mixer itself. Color or emulsifiers may also be added at this time. A softener may also be added at this time, along with any syrup used, and a portion of the bulking agent. Further portions of the bulking agent may then be added to the mixer. The flavoring agent is typically added with the final portion of the bulking agent. The entire mixing procedure typically takes from five to fifteen minutes, but longer mixing times may sometimes be required.

Tests were done to compare the stability of Alitame and aspartame. Although Alitame was used at a much lower level than aspartame, since Alitame is five to ten times sweeter than Aspartame, the rate of degradation determined from the tests seemed to be the same in sugar type gum formulations, independent of the sweetener level. Results reported are the average from five experiments on sugar gum using five different gum bases.

TABLE I

| | % Of Original Sweetener Level Lost | | | | |
|---|---|---|---|---|---|
| | Initial Level | 1 week | 2 weeks | 4 weeks | 8 weeks |
| Aspartame | 0.20% | 2.7% | 9.3% | 10.8% | 17.4% |
| Alitame | 0.04% | 3.2% | 6.1% | 12.8% | 21.6% |

These results indicate that Alitame has stability similar to aspartame in sugar gum formulations. However, tests on sugarless gums suggested that alditols like sorbitol and mannitol, and glycerine, might degrade Alitame. As a result, several tests of Alitame in solution with these common sugarless ingredients were conducted.

Tests 1-5 were carried out to see the effect of sugar alcohols and glycerine upon Alitame. A 0.01% Alitame aqueous solution was divided equally into 5 portions. In Tests 1-3, glycerine, sorbitol and mannitol were individually added to one of the first three portions in proportions of 5 parts sugar alcohol or glycerine and 95 parts Alitame solution. In test 4, a 75/25 blend of HSH (Lycasin)/glycerine was added to the fourth portion in proportion of 5 parts of the blend and 95 parts Alitame solution. In test 5, there was no addition of sugar alcohol. Next, each test sample was divided in half and each half adjusted to a pH of either 5 or 7. Each resulting test sample was further divided in half again and one half was stored at room temperature while the second half was stored at 120° F.. The Alitame stability results are indicated in Table II below.

TABLE II

| | Percent Original Alitame Remaining After 12 Weeks | | | |
|---|---|---|---|---|
| | 75° F. pH 5 | 75° F. pH 7 | 120° F. pH 5 | 120° F. pH 7 |
| Test 1 5% Glycerol | 100 | 64 | 69 | 0* |
| Test 2 5% Sorbitol | 100 | 100 | 75 | 0** |
| Test 3 5% Mannitol | 100 | 94 | 80 | 0 |
| Test 4 5% HSH/ Glycerine blend | 100 | 94 | 77 | 47 |
| Test 5 Control (Alitame Only) | 97 | 100 | 95 | 79 |

*No Alitame detected at 6 weeks.
**No Alitame detected at 8 weeks.

Analysis of the results showed that, unexpectedly, Alitame degraded at a much quicker rate in solutions of sugar alcohols and glycerine than solutions not containing these compounds, and that glycerine and, to a slightly lesser extent, the low molecular weight sugar alcohols sorbitol and mannitol seemed to particularly cause Alitame degradation. Also, the HSH appeared to slow Alitame degradation, considering the presence of glycerine in test 4.

Based on the above information, the following gum formulations were made:

| | A (%) | B (%) | C (%) | D (%) |
|---|---|---|---|---|
| Base | 25.5 | 25.5 | 25.5 | 25.5 |
| Lecithin | 0.2 | 0.2 | 0.2 | 0.2 |
| Sorbitol | 49.46 | 49.46 | 46.46 | 46.46 |
| Mannitol | 8.0 | 8.0 | 8.0 | 8.0 |
| Sorbitol Liquid (70% Solids) | 7.7 | 15.4 | — | — |
| Glycerin | 7.7 | — | — | 9.2 |
| Peppermint Flavor | 1.4 | 1.4 | 1.4 | 1.4 |
| HSH (75% Solids) | — | — | 18.4 | 9.2 |
| Alitame | 0.04 | 0.04 | 0.04 | 0.04 |
| | 100 | 100 | 100 | 100 |

These samples were stored in an incubator at 85° F. for B weeks and sampled periodically at 1,2,4,6 & 8 weeks, and analyzed for remaining, undegraded Alitame. Results are shown in Table III.

TABLE III

EFFECTS OF GLYCERINE/HSH ON ALITAME STABILITY IN GUM FORMULATIONS
% Alitame (% of original remaining)

| WEEKS | A | B | C | D |
|---|---|---|---|---|
| 0 | 0.039 (100) | 0.040 (100) | 0.037 (100) | 0.039 (100) |
| 1 | 0.029 (74) | 0.032 (80) | 0.034 (92) | 0.033 (85) |
| 2 | 0.023 (59) | 0.028 (70) | 0.036 (97) | 0.025 (64) |
| 4 | 0.016 (41) | 0.022 (55) | 0.027 (73) | 0.021 (54) |
| 6 | 0.011 (28) | 0.018 (45) | 0.025 (68) | 0.018 (46) |
| 8 | 0.008 (20) | 0.016 (40) | 0.021 (57) | 0.011 (28) |

The results showed that the Alitame in Formula A degraded the most. This formula contained sorbitol, mannitol and glycerine. In formula B where glycerine was removed, there was a significant improvement in stability. Formula C, which had HSH but no glycerine, had the best shelf life stability of Alitame and was significantly better than Formula B. Formula D, which had HSH and glycerine, showed similar degradation as Comparisons of percentage of remaining Alitame at each test period for formulas A vs. D and B vs. C are shown below:

TABLE IV

| WEEKS | % REMAINING FORMULA A | % REMAINING FORMULA D | % DIFFERENCE | % INCREASE % DIFFERENCE/% REMAINING IN A |
|---|---|---|---|---|
| 1 | 74 | 85 | +11 | 15 |
| 2 | 59 | 64 | +5 | 8 |
| 4 | 41 | 54 | +13 | 32 |
| 6 | 28 | 46 | +18 | 64 |
| 8 | 20 | 28 | +8 | 40 |
| | | | | Average = 32% Improvement |

| WEEKS | % REMAINING FORMULA B | % REMAINING FORMULA C | % DIFFERENCE | % INCREASE % DIFFERENCE/% REMAINING IN B |
|---|---|---|---|---|
| 1 | 80 | 92 | +12 | 15 |
| 2 | 70 | 97 | +27 | 39 |
| 4 | 55 | 73 | +18 | 33 |
| 6 | 45 | 68 | +23 | 51 |
| 8 | 40 | 57 | +17 | 43 |
| | | | | Average = 36% Improvement |

Comparing formulas A vs. D, the amount of glycerine is about the same, but the sorbitol liquid was replaced with HSH at the same moisture level (both formulas A and D had 2.3% moisture contributed from the sorbitol liquid or the HSH). Due to the use of HSH, there was an average increase in stability at 85° F. of 32%.

Comparing formulas B vs. C, the amount of glycerine is 0%, but the sorbitol liquid was replaced with HSH at the same moisture level (both formulas B and C had 4.6% moisture contributed from the sorbitol liquid or HSH). Due to the use of HSH, there was an average increase in stability at 85° F. of 36%.

Generally, by the use of HSH, it is believed that the amount of Alitame which will need to be formulated in the gum is between 10 and 50% less than the amount which would need to be formulated to provide the same recovery after eight weeks of storage of a gum at 85° F.

From the above results, it is believed that HSH can be utilized, and/or glycerine can be avoided, in comestibles to prevent Alitame degradation. Where effective amounts of Alitame are used, comestibles made with Alitame may be stored at 85° F. for eight weeks and have increased stability by at least 20% over a comparable formula without HSH.

Where glycerine was excluded, and no HSH was used in the gum, after eight weeks of storage at 85° F., 40% of the Alitame originally present in the gum was still recoverable.

Where HSH was included in, and glycerine was excluded from, the chewing gum, a gum was produced which provided Alitame stability such that after eight weeks of storage at 85° F., over 50% of the amount of Alitame originally present in the gum was still recoverable.

The preferred comestible of the present invention is a sugarless chewing gum having the following composition: 20-30% base, 5-25% HSH, 40-60% sugar alcohols (preferably mannitol and sorbitol), 0.005-0.2% Alitame and no glycerine.

Of course, it should be understood that a wide range of changes and modifications can be made to the preferred embodiment described above. It is therefore intended that the foregoing detailed description be regarded as illustrative rather than limiting, and that it be understood that it is the following claims, including all equivalents, which are intended to define the scope of this invention.

We claim:

1. A chewing gum product comprising from about 5% to about 95% of a gum base; about 30% to about 90% of a bulking agent; about 0.1% to about 10% of a flavor agent, sweetness imparting amounts of Alitame and aqueous hydrogenated starch hydrolysate in amounts effective to stablize said Alitame sweetening agent against decomposition during storage of 85° F. for eight weeks, whereby at least a 20% increase in Alitame stability, compared to a similar formula without the hydrogenated starch hydrolysate, is achieved.

2. The chewing gum product of claim 1 comprising about 0.005% to about 0.2% Alitame.

3. The chewing gum product of claim 1 wherein amounts of hydrogenated starch hydrolysate included comprises between about 5% and about 25% of the product.

4. A chewing gum composition comprising from about 5% to about 95% of a gum base; about 30% to about 90% of a bulking agent; about 0.1% to about 20% of a flavor agent and an admixture of
   (a) a formulated amount of unencapsulated Alitame sweetening agent and
   (b) an aqueous solution of hydrogenated starch hydrolysate,
   (c) wherein the aqueous solution of hydrogenated starch hydrolysate is in amounts effective to stabilize said Alitame sweetener when said chewing gum is stored at 85° F. for at least eight weeks, at least 40% of the original; formulated amount of said Alitame sweetening agent is recoverable,
   (d) said formulated amount of Alitame sweetening agent being about 10% to about 50% less than the amount of said Alitame sweetening agent which would have been needed to recover an equal amount of Alitame sweetener in the absence of the aqueous hydrogenated starch hydrolysate stabilizer.

5. The chewing gum composition of claim 4 wherien the amount of hydrogenated starch hydrolysate employed is between about 5% and 25% of the composition.

6. The chewing gum composition of claim 4 wherein the formulated amount of Alitame comprises between about 0.005% and about 0.2% of the composition.

7. A process for preparing and storing a chewing gum composition comprising formulating and storing a gum composition comprising from about 5% yo about 95% of a gum base; about 30% to about 90% of a bulking agent; about 0.1% to about 10% of a flavor agent and a formulated, and at least partially sweetening, amount of unencapsulated Alitame sweetening agent.
   said composition further having an alditol content which, upon the normal commercial storage of said composition in the absence of a stabilizer for said Alitame sweetening agent, would cause or accelerate the decomposition of said formulated amount of said Alitame sweetening agent into decomposition products which are devoid of sweetening characteristics,
   further admixing into and formulating said chewing gum composition with, as a stabilizer for said Alitame sweeteninga gent, an aqueous solution of hydrogenated starch hydrolysate in such amounts as to stabilize said Alitame sweetening agent so as to allow for the recovery from said chewing gum composition of at least 50% of said formulated amount of Alitame sweetening agent after the normal commerical storage of said chewing gum composition for at least eight weeks.

8. A process for reducing the amount of un-encapsulated Alitame needed to be formulated into a chewing gum product comprising from about 5% to about 95% of a gum base; about 30% to about 90% of a bulking agent; and about 0.1% to about 10% of a flavor agent, wherein the gum product is at least partially sweetened therewith and which also contains Alitame destabilizing amounts of alditols,
   and while still providing for a recoverable Alitame content of X% after the ambient commercial stoarge of said chewing gum product for at least eight weeks,
   said X% being at least 20% of the reduced amount of said Alitame to be formulated into said chewing gum product,
   which comprises:
   formulating said chewing gum product with an amount of Alitame which is about 10 to 50% less than the amount of Alitame which would have been needed in said chewing gum product, in the absence of a stabilizer for said Alitame, to provide for a recoverable level of X% of Alitame after said storage period, and
   with, as a stabilizer for such reduced amount of Alitame, an aqueous solution of hydrogenated starch hydrolysate in such amounts as to effectively stabilize said alitame and provide for a recoverable Alitame content of X% after said storage period.

9. A chewing gum composition comprising from about 5% to about 95% of a gum base; about 30% to about 90% of a bulking agent; about 0.1% to about 10% of a flavor agent and an admixture of
   (i) at least 40% sugar alcohols,
   (ii) about 0.005% to about 0.2% of unencapsulated Alitame sweetening agent, and
   (iii) an aqueous solution of hydrogenated starch hydrolysate in amounts effective to stabilize said Alitame sweetening agent when said chewing gum composition is stored at 85° F. for at least eight weeks so that at least 40% of said (ii) amount of Alitame sweetening agent is then recoverable.

10. The chewing gum composition of claim 9 wherein the chewing gum comprises (i) about 20% to about 30% gum base;
(ii) about 5% to about 25% HSH syrup, and
(iii) about 40% to about 60% alditols selected from the group consisting of sorbitol, mannitol and mixtures thereof.

11. The chewing gum composition of claim 9 wherein the gum formulation is substantially free of glycerine.

12. The chewing gum composition of claim 11 wherein after eight weeks of storage over 50% of the original Alitame sweetening agent is recoverable.

* * * * *

UNITED STATES PATENT AND TRADEMARK OFFICE
CERTIFICATE OF CORRECTION

PATENT NO. : 5,034,231

DATED : July 23, 1991

INVENTOR(S) : Robert J. Yatka et al.

It is certified that error appears in the above-identified patent and that said Letters Patent is hereby corrected as shown below:

On the cover page after the heading "Assignee", please delete "Wrigly," and substitute therefor --Wrigley--.

IN THE BACKGROUND OF THE INVENTION

In column 1, line 25, please delete "wellknown" and substitute therefor --well-known--.

In column 1, line 59, after "patents" please insert --.--.

IN THE DETAILED DESCRIPTION OF THE
INVENTION AND PREFERRED EMBODIMENTS

In column 2, line 36, after "sorbitol" please insert --.--.

In column 2, lines 53 and 54, after "material" please insert --.--.

In column 3, line 6, after "carnauba" please insert --.--; and after "However" please insert --,--.

In column 3, line 22, after "excluded" please insert --.--.

In column 3, line 48, after "thereof" please insert --.--.

UNITED STATES PATENT AND TRADEMARK OFFICE
CERTIFICATE OF CORRECTION

PATENT NO. : 5,034,231

DATED : July 23, 1991

INVENTOR(S) : Robert J. Yatka et al.

It is certified that error appears in the above-identified patent and that said Letters Patent is hereby corrected as shown below:

In column 4, line 19, after "pellets" please insert --.--.

In column 5, line 59, please delete "B" and substitute therefor --8--.

In column 6, line 19, after "as" please insert --Formula B.--.

In column 6, line 20, begin a new paragraph with "Comparisons".

IN THE CLAIMS

Col. 7 In claim 4, line 43, please delete "20%" and substitute therefor --10%--; and in line 53, after "original" please delete --;--.

Col. 7 In claim 5, line 62, please delete "wherien" and substitute therefor --wherein--.

Col. 8 In claim 7, line 3, please delete "yo" and substitute therefor --to--; in line 7, after "agent" please delete "." and substitute therefor --;--; and in line 18, please delete "sweeteninga gent" and substitute therefor --sweetening agent--.

UNITED STATES PATENT AND TRADEMARK OFFICE
CERTIFICATE OF CORRECTION

PATENT NO. : 5,034,231

DATED : July 23, 1991

INVENTOR(S) : Robert J. Yatka et al.

It is certified that error appears in the above-identified patent and that said Letters Patent is hereby corrected as shown below:

Col. 8 In claim 8, line 36, please delete "stoarge" and substitute therefor --storage--.

Signed and Sealed this

Twenty-third Day of November, 1993

Attest:

BRUCE LEHMAN

Attesting Officer

Commissioner of Patents and Trademarks